Feb. 9, 1932.   J. J. WESLEY ET AL   1,844,050
CABINET
Filed Oct. 31, 1930   2 Sheets-Sheet 1
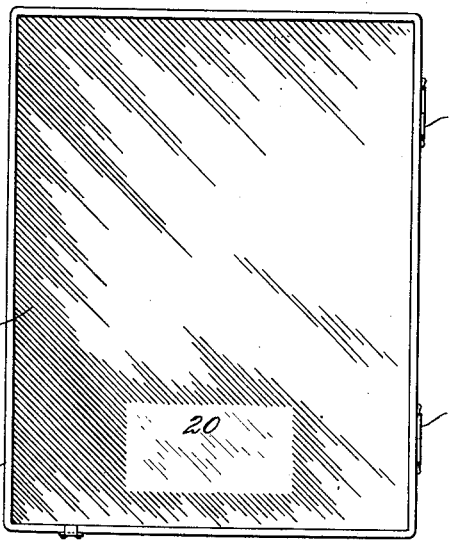
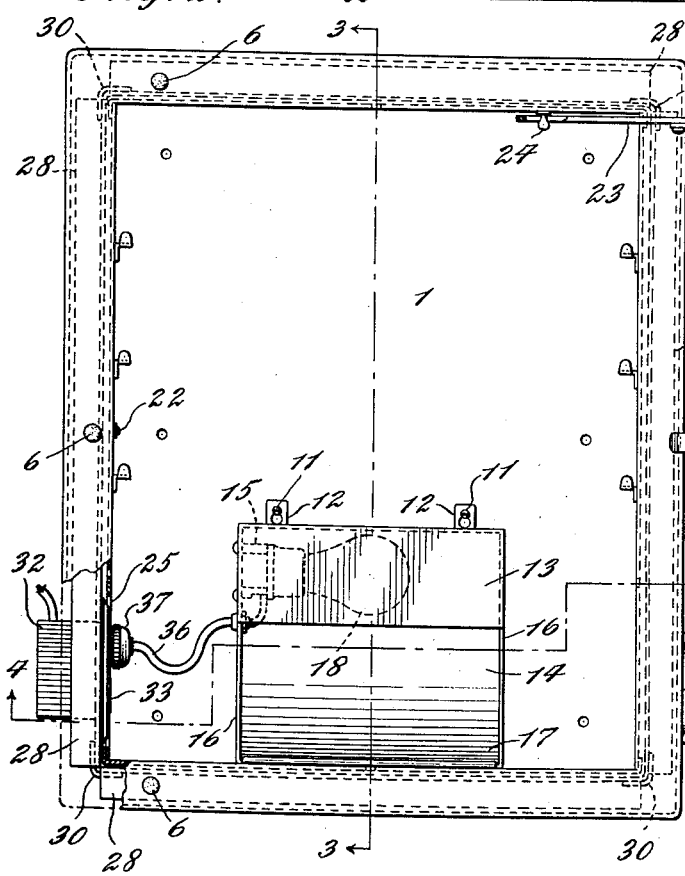
INVENTOR
Joseph J. Wesley
BY William J. Newton
ATTORNEY Feb. 9, 1932.  J. J. WESLEY ET AL  1,844,050
CABINET
Filed Oct. 31, 1930   2 Sheets-Sheet 2

INVENTOR
Joseph J. Wesley
BY William J. Newton
ATTORNEY

Patented Feb. 9, 1932

1,844,050

UNITED STATES PATENT OFFICE

JOSEPH J. WESLEY, OF DOUGLASTON, AND WILLIAM J. NEWTON, OF ASTORIA, NEW YORK, ASSIGNORS TO METROPOLITAN ELECTRIC MFG. CO., A CORPORATION OF NEW JERSEY

CABINET

Application filed October 31, 1930. Serial No. 492,408.

This invention relates to a cabinet of the built-in type. The invention is particularly directed to a cabinet having a lighting unit therein, and has for its objects to provide a cabinet of greater convenience than the existing cabinets of this type, simple in construction, simple of assembly and one which may be mounted with facility, and which will fully illuminate the face of one standing in front of it.

Heretofore, in mounting built-in cabinets containing lighting units, it has been the practice to run the electrical conduit or cable through the rear wall of the cabinet into the casing of the lighting unit. In such cases, it is necessary, when the lighting unit is to be electrically connected, to remove the reflector of the lighting unit behind which the electrical conduit or cable enters the cabinet. Frequently, due to careless workmanship in connecting the lighting units within the cabinet, the reflectors are injured and must be renewed. Furthermore, the reflectors are not always properly replaced and the lighting unit does not operate efficiently.

In accordance with the invention, there is provided a convenience outlet in the side of the cabinet receptacle which is built in the wall and in which the cabinet is received. The lighting unit is provided with a cord having a plug on the end thereof which is adapted to be plugged into the convenience outlet. With this arrangement, it is unnecessary to disturb the lighting unit in order to connect it to the electric lighting circuit.

An advantage of our construction is the fact that the lighting unit may be easily and readily installed without the aid of skilled mechanics.

Specifically, we provide a cabinet receptacle or buck, as it is known in the trade, which is adapted to be built into a wall. The buck has an opening through the side thereof and an electrical outlet box is secured to the outer surface of the side of the receptacle, covering the opening therethrough. Into this outlet box an electrical conduit or cable may be entered. A convenience outlet is mounted in the outlet box and is connected to the lighting circuit. The cabinet which is adapted to be received within the receptacle or buck has an opening in the side thereof corresponding to the opening in the side of the receptacle. The opening through the side of the cabinet is sufficiently large to accommodate a flush plate which is mounted over the convenience outlet and covers the opening through the side of the buck at the inner surface thereof. The side of the buck are provided with slots which are adapted to receive bolts extending through the sides of the cabinet by means of which the cabinet is secured in the buck.

Within the cabinet there is an indirect lighting unit which comprises a casing having an opening through the side thereof facing the front of the cabinet. A light is mounted within the casing remote from the opening in the side thereof, and a reflector for reflecting the light emitted from the lamp through the opening in the side of the receptacle is provided. The door of the cabinet which is hingedly mounted thereon has an opening therethrough corresponding to the opening in the side of the lighting unit and being in alignment therewith when the door is in the closed position. A mirror constitutes the outer surface of the door, the mirror being provided with a transparent portion registering with the opening in the door so that the light reflected through the opening in the lighting unit within the cabinet may pass through the door.

Other objects and advantages of the invention will be apparent from the following particular description of one embodiment thereof taken in connection with the accompanying drawings in which:

Fig. 1 is an elevation of a cabinet constructed in accordance with our invention;

Fig. 2 is an enlarged elevation of the same, the door of the cabinet being in the open position;

Fig. 3 is a longitudinal sectional elevation taken on the line 3—3 of Fig. 2;

Figure 4:
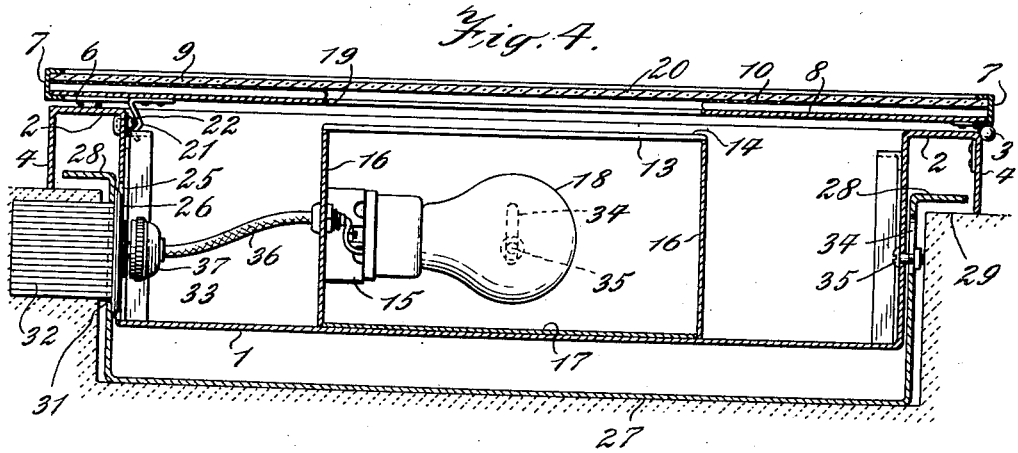
Fig. 4 is a transverse section taken on the irregular line 4—4 of Fig. 2.
Figure 5:
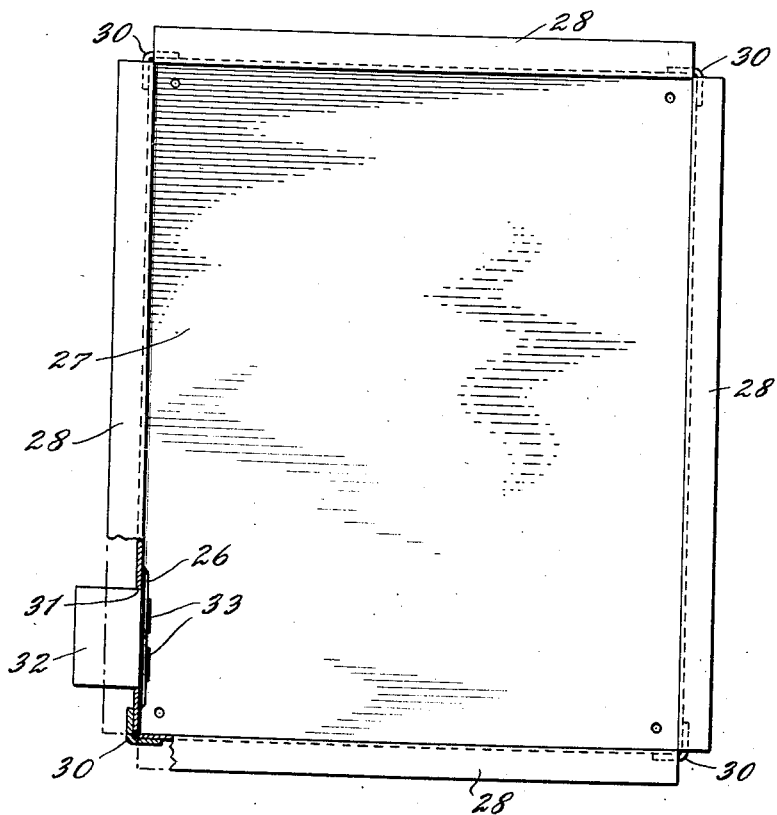
Fig. 5 is an elevation of the cabinet receptacle or buck.

The cabinet shown in the drawings is of the built-in type. The cabinet comprises a sheet metal casing 1, the casing being reversely bent at the outer edges thereof to form a channel around the outer edge of the casing. The web 2 of the channel constitutes the edge of the cabinet. At one side of the cabinet, hinges 3 are secured to the outer flange 4 of the channel. The hinges 3 support a door 5. The hinges are such that the door 5 is maintained at a distance from the edge of the casing 1, abutments 6 being provided at spaced intervals on the outer surface of the web or edge 2 of the cabinet so that the door 5, in the closed position thereof, is maintained in spaced relation to the cabinet. The door 5 comprises a channel shape frame 7 within which there is mounted a metal plate 8 and a mirror 9, packing 10 being interposed between the metal plate 8 and the mirror 9 and the mirror constituting the outer surface of the door.

Within the cabinet near the bottom thereof, an indirect lighting unit is secured to the rear wall by means of screws 11. The screws are received in slots provided in lips 12 which are secured to the casing of the lighting unit. The slots in the lips are enlarged near one end so that the lighting unit may be removed from the screws without removing the screws from the threaded openings in the rear wall of the cabinet. The casing of the lighting unit is substantially rectangular. The side 13 of the casing which faces the front of the cabinet is provided with a rectangular opening 14 near the lower end thereof. A light receptacle 15 is mounted within the casing above the opening in the front wall thereof, the lighting receptacle being secured to the inner surface of one of the side walls 16 of the casing. The rear wall 17 of the lighting unit curves toward the front wall as shown in Fig. 3 and constitutes the rear and bottom wall of the lighting unit. The inner surface of the rear wall 17 forms a reflector which reflects the light emitted from the lamp 18 in the lamp receptacle 15 through the opening 14 in the front wall of the lighting unit casing.

In alignment with the opening 14 in the front wall of the lighting unit, an opening 19 is provided through the metal plate 8 of the door of the cabinet. In front of this opening 19, the reflecting surface of the mirror 9 constituting the outer surface of the door is removed, forming a transparent portion 20 in the mirror 9 so that the light directed through the opening in the lighting unit will pass through the door. The door is maintained in a closed position by a spring catch 21 which engages a knob 22 secured to the inner surface of the side wall of the cabinet. The door may also be secured in the open position by a bracket 23 secured to the inner surface of the door and cooperating with a depending projection 24 in the cabinet in a manner well known in the art.

As heretofore described, the door of the cabinet is maintained in spaced relation to the cabinet. This space between the door and the cabinet is provided so that there will be a free circulation of air through the cabinet for the purpose of carrying away the heat generated by the lighting unit within the cabinet. The air will of course enter at the lower end of the cabinet and pass upwardly and out of the cabinet at the upper end.

Near the lower end of the cabinet an opening 25 is provided in one side thereof. This opening is adapted to fit over a flush plate 26 mounted on the inner surface of a buck or cabinet receptacle 27. The buck 27 is a steel receptacle which is adapted to receive the cabinet 1. The buck is adapted to be built into a wall and is provided with flanges 28 which abut against the surface of the wall 29. Reinforcing members 30 may be provided at the corners of the buck if desired. Near the lower end of the buck, there is an opening 31 through one side thereof. This opening is in the side corresponding to the side of the cabinet 1 through which the opening 25 is provided and is so positioned that it is in alignment with the opening 25 in the side of the cabinet when the cabinet is mounted in the buck 27. An electrical outlet box 32 is secured to the outer surface of the side of the buck and covers the opening 31 therethrough. In this outlet box 32, there is mounted a convenience outlet 33 which is adapted to receive one or more plug connectors. The usual flush plate 26 is mounted over the convenience outlet 33 in the electrical outlet box 32. All of the sides of the buck are provided with slots 34 which are adapted to receive bolts 35 extending through the sides of the cabinet by means of which bolts the cabinet is secured in the buck. When the cabinet 1 is secured in the buck, the edges of the flanges 4 of the cabinet abut against the outer surface of the wall 29 in which the buck is mounted and the flanges 28 of the buck 27 are received in the channels formed at the edges of the cabinet 1.

The lighting unit within the cabinet is provided with a flexible cord 36 having a plug connector 37 on the end thereof. Thus, when the cabinet is secured in the buck, all that is necessary to connect the lighting unit within the cabinet to the electric lighting circuit is to insert the plug connector 37 into the convenience outlet 33. It will, therefore, be seen that the cabinet can be mounted in the buck and the lighting unit connected to the lighting circuit by any layman, the services of a skilled mechanic being entirely unnecessary.

The feature of removing part of the reflecting surface of the mirror constituting the outer surface of the door to provide a transparent portion in front of the opening permits the outer surface of the door to be made from a single piece of glass which decreases the cost of manufacturing the cabinets and materially improves their appearance.

It is obvious that various changes may be made in the details of the embodiment shown in the drawings and described immediately above within the principle and scope of the invention as expressed in the appended claims.

We claim:

1. In combination, a cabinet receptacle adapted to be built into a wall and having an opening through the side thereof, an electrical outlet box secured to the outer surface of the side of the receptacle and covering the opening therethrough, a convenience outlet in said outlet box, a flush plate covering the opening in the inner surface of the side of the receptacle, a cabinet having a lighting unit therein adapted to be received within said receptacle and having an opening thrugh the side thereof corresponding to the opening in the side of the receptacle, the opening through the side of the cabinet being sufficiently large to accommodate the flush plate covering the opening at the inner surface of the side of the receptacle, and means for securing the cabinet in the receptacle.

2. In combination, a cabinet, an indirect lighting unit within the cabinet comprising a casing having an opening through the side thereof facing the front of the cabinet, a light within the casing removed from the opening in the side thereof, and a reflector for reflecting the light emitted from the lamp through the opening in the side of the casing, a door hingedly mounted upon the cabinet, the door having an opening therethrough corresponding to the opening in the side of the lighting unit and being in alignment therewith when the door is in the closed position, and a mirror constituting the outer surface of the door, the mirror having a transparent portion covering the opening in the door for the emission of light through the door.

3. In combination, a cabinet, an indirect lighting unit within the cabinet comprising a casing having an opening through the side thereof facing the front of the cabinet, a light within the casing removed from the opening in the side thereof, a reflector for directing the light emitted from the lamp through the opening in the side of the casing, a door hingedly mounted upon the cabinet, a mirror constituting the outer surface of the door, the door having a transparent portion corresponding to the opening in the side of the lighting unit within the cabinet for the emission of light through the door, and means for maintaining the door in the closed position thereof, in spaced relation to the cabinet for the free circulation of air.

4. In combination, a cabinet receptacle adapted to be built into a wall and having an opening through one side thereof, an electrical outlet box secured to the outer surface of the side of the receptacle and covering the opening therethrough, a convenience outlet in said outlet box adapted to receive an electrical plug connector, a cabinet adapted to be received within said receptacle and having an opening through the side thereof corresponding to the opening in the side of the receptacle, a lighting unit secured within the cabinet adapted to be energized through said convenience outlet, and means for securing said cabinet in said receptacle.

5. In combination, a cabinet receptacle adapted to be built into a wall and having an opening through one side thereof, an electrical outlet box secured to the side of the receptacle and covering the opening therethrough, a convenience outlet in said outlet box adapted to receive a connector, a cabinet adapted to be received within said receptacle having an opening in the side thereof corresponding to the opening in the side of the receptacle, an indirect lighting unit within the cabinet including a casing having an opening through the side thereof facing the front of the cabinet, a light within the casing removed from the opening in the side thereof and adapted to be energized through the convenience outlet, a reflector for directing the light emitted from the lamp through the opening in the side of the casing, a door hingedly mounted upon the cabinet, and a mirror constituting the outer surface of the door, the door having a transparent portion corresponding to the opening in the side of the casing of the lighting unit within the cabinet.

In witness whereof, we hereunto subscribe our signatures.

JOSEPH J. WESLEY.
WILLIAM J. NEWTON.